Oct. 13, 1936. J. O'D. SHEPHERD 2,057,541
SUPERVISORY CONTROL SYSTEM
Filed Nov. 18, 1930 5 Sheets-Sheet 1
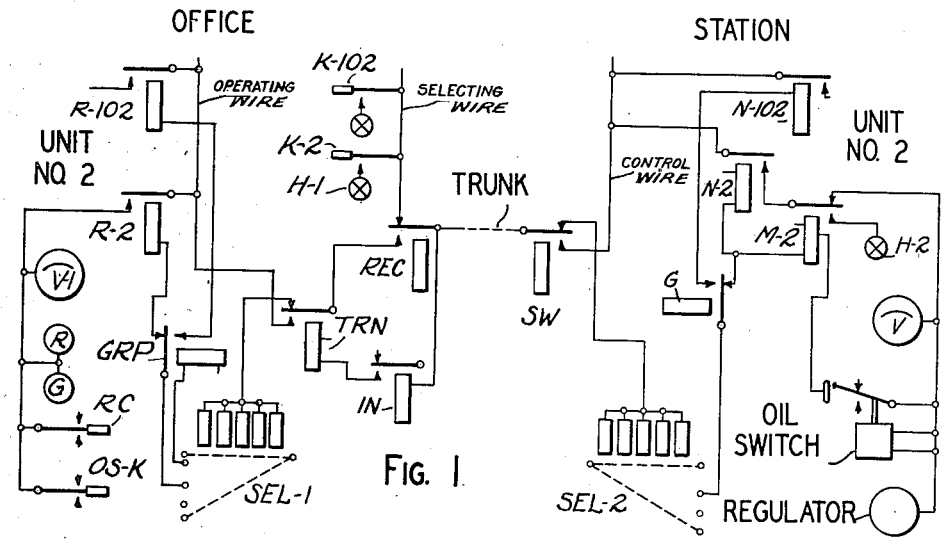
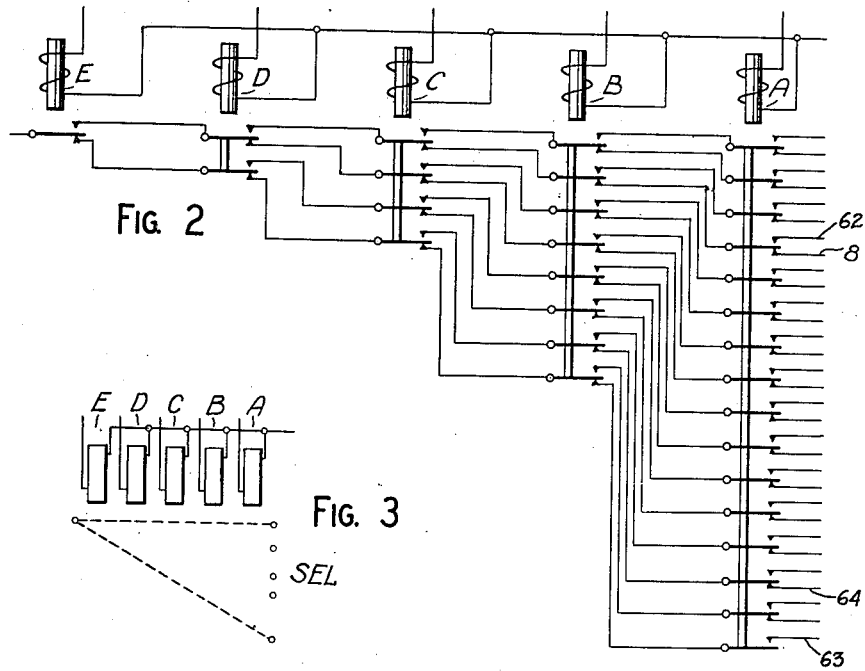
INVENTOR
JUDSON O'D. SHEPHERD
BY
ATTORNEY

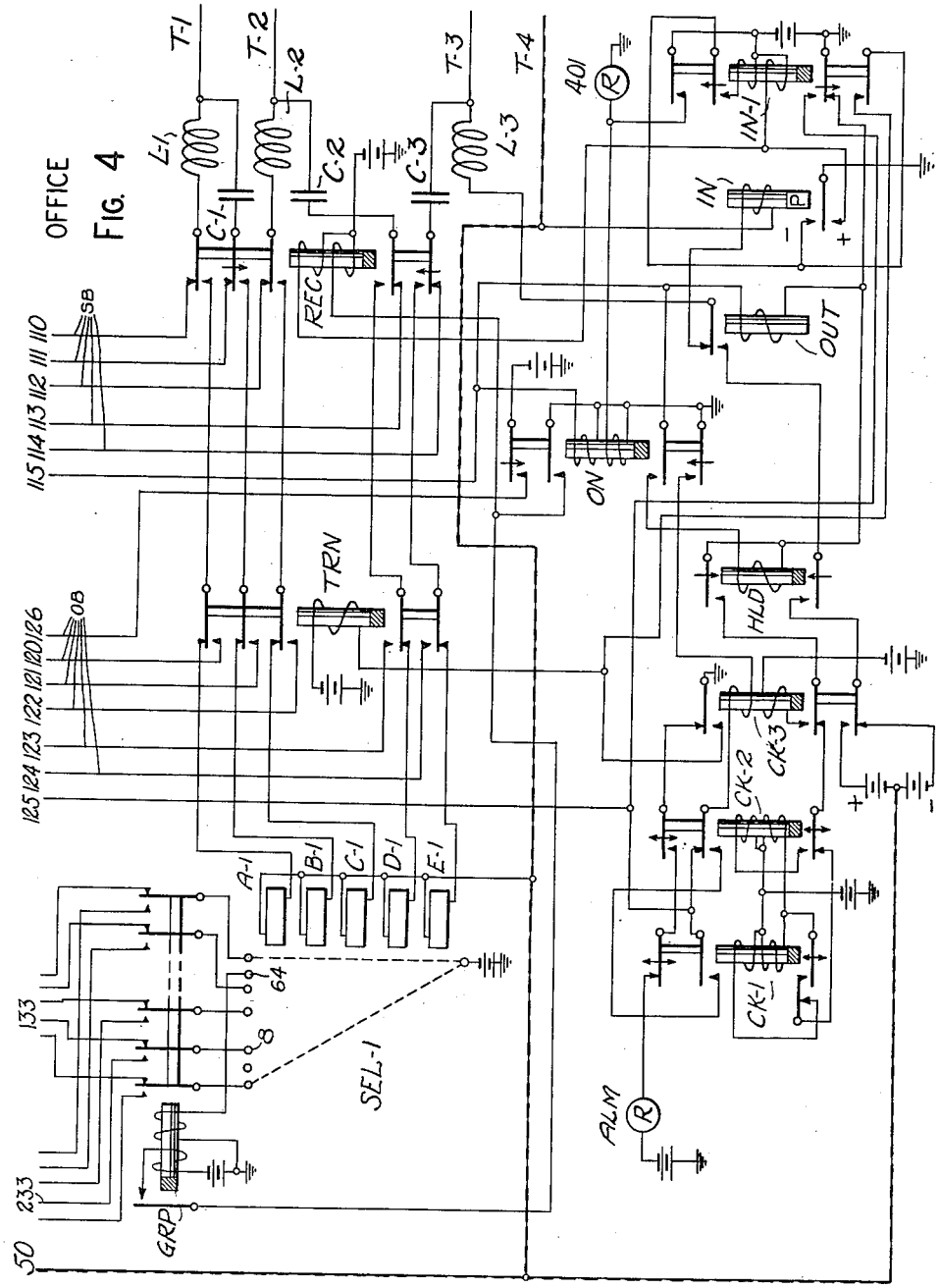

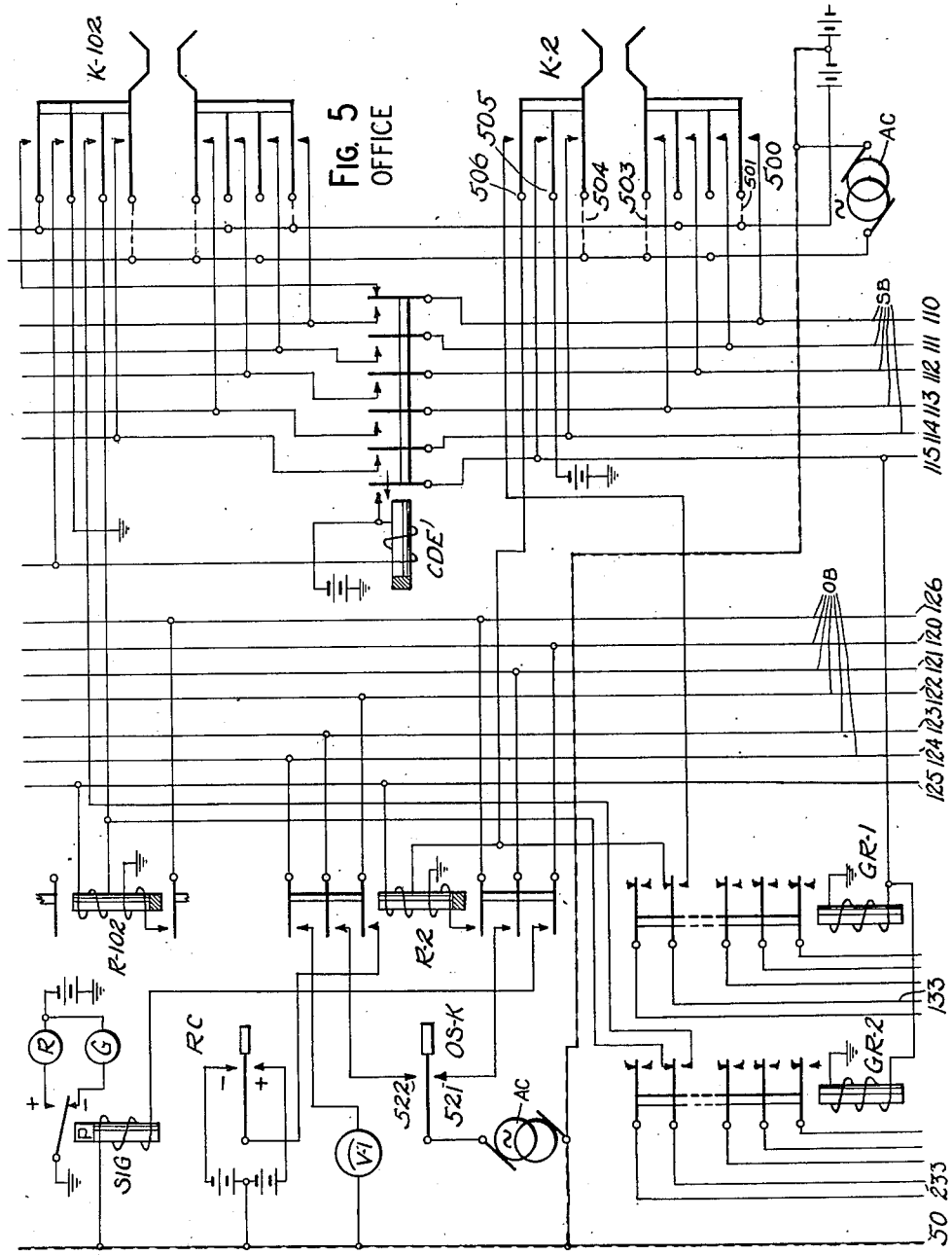

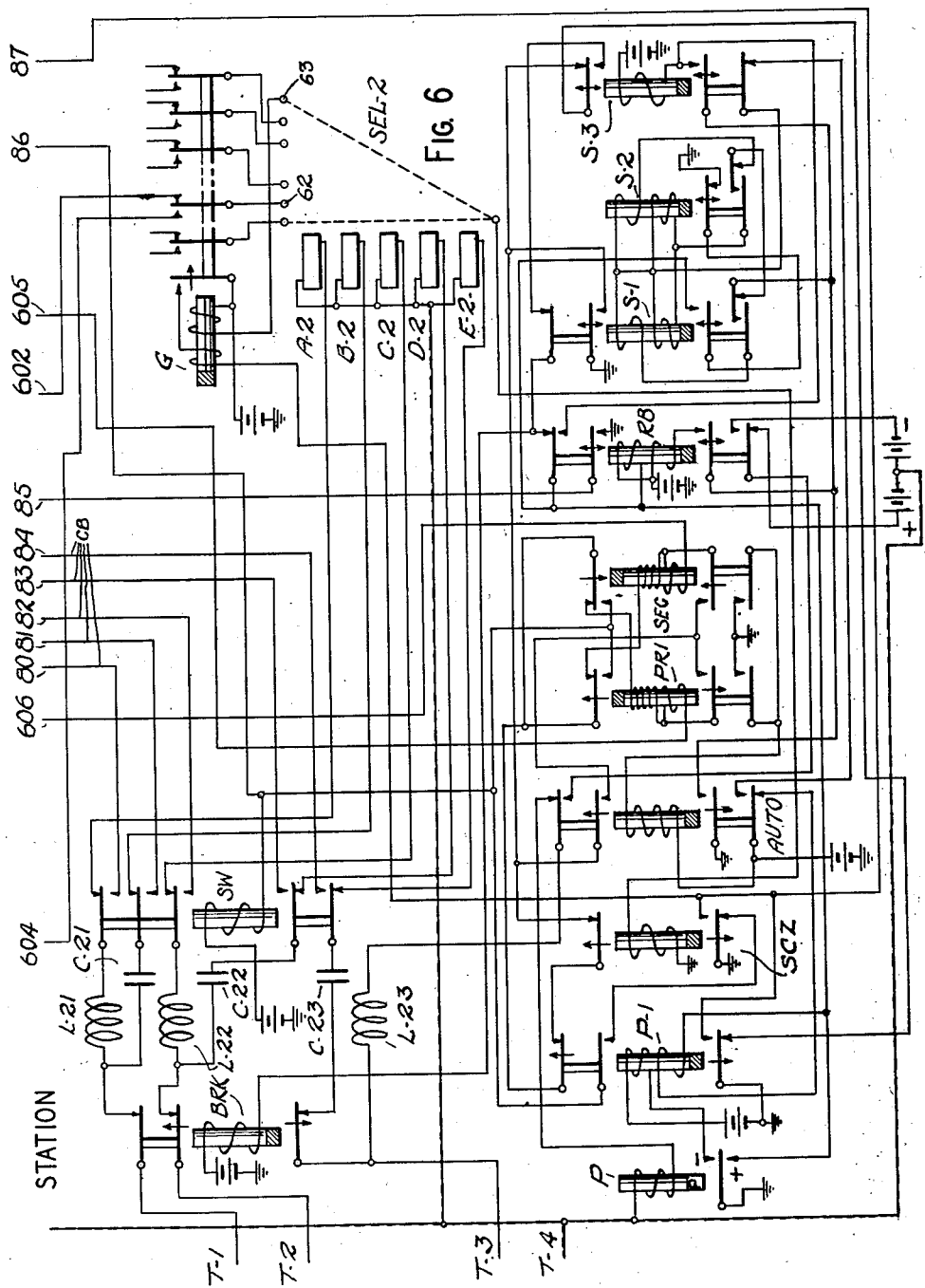

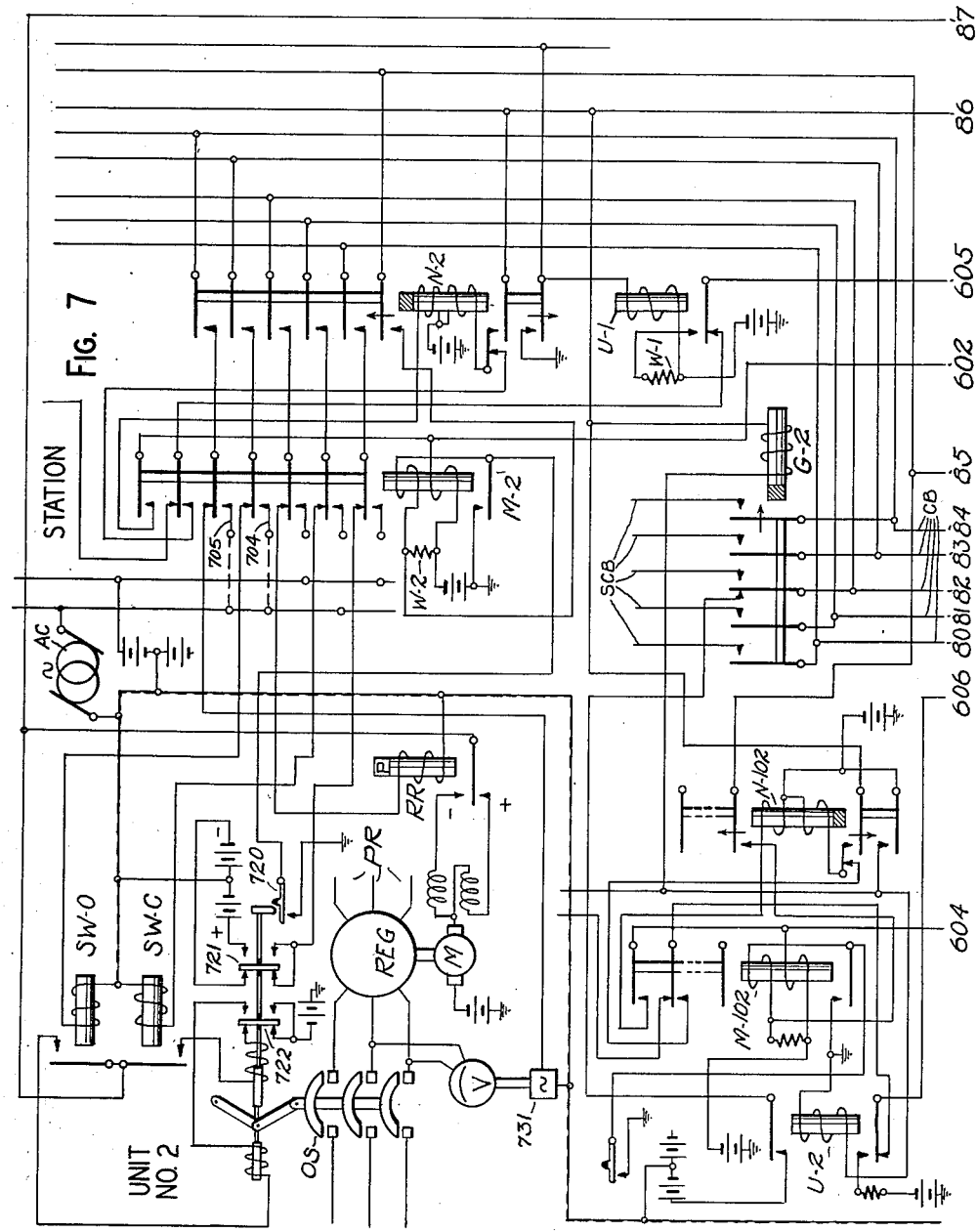

Patented Oct. 13, 1936

2,057,541

UNITED STATES PATENT OFFICE 2,057,541

SUPERVISORY CONTROL SYSTEM

Judson O'D. Shepherd, Atlanta, Ga., assignor to General Electric Company, a corporation of New York Application November 18, 1930, Serial No. 496,447

25 Claims. (Cl. 177—353)

My invention relates to supervisory control systems and particularly to systems for supervising and controlling remotely disposed electrical equipment from a central point or dispatcher's office.

One object of my invention is to provide improved means for the selective control and supervision of remotely positioned mechanism.

Another object of my invention is to provide means whereby the selective operations result from current conditions comprising codes set up in the inter-connecting trunk conductors.

Another object of my invention is to provide improved means whereby the selection actually effected at the remote station is automatically checked against that intended, and the control apparatus made inoperative in the event of an error in this selection.

Still another object of my invention is to provide means for obtaining multiple selections of apparatus units from one selective mechanism, and thereby effecting a large number of operations at the station.

There are other objects of the invention which, together with the foregoing, will be described in the detailed specification which is to follow.

Referring now to the drawings which comprise Figs. 1 to 7 inclusive, I have shown, by means of conventional diagrams, the apparatus and circuits for carrying out my invention.

Fig. 1 is a one line diagram for the purpose of facilitating the description of the general operation of my invention and the inter-relation of certain of its principal components.

Fig. 2 is a relay group in the familiar "pyramid" arrangement whereby one and only one local circuit is extended through the chain of relay contacts for each of the thirty-one possible combinations of relays in their operated positions. This arrangement is employed in my invention at both the dispatcher's office and the remotely disposed mechanism or station, and is indicated in the circuit diagrams by the symbol shown in Fig. 3.

Figs. 4 and 5 show the apparatus and circuits located at the dispatcher's office, with the former comprising in particular the common equipment and the latter that which is primarily associated with the individual power equipment units, and groups of units.

Figs. 6 and 7 show the apparatus and circuits located at the station, and these, likewise, respectively show the common and the individual apparatus and circuits.

It is the general requirement of an adequate supervisory control system that it provide means for selectively bringing under the control of the dispatcher the apparatus units at the station, and indicating to him the results of the operations he initiates. It is, furthermore, a requirement that automatic operation of the apparatus units at the station, such as the opening of a circuit breaker, be indicated to the dispatcher. These, together with other special features as provided by my invention, can best be described by reference to the "one line" diagram shown in Fig. 1, which illustrates the general operation covered in detail by other of the diagrams.

With reference to this figure, K—2 and K—102 are switches of the familiar key or similar type, each corresponding to an apparatus unit at the station and an associated group of meters, signal lamps and operating switches at the dispatcher's office.

Assume, for the purpose of describing a typical operation, that it is desired to operate and control apparatus Unit No. 2 at the station. The operation of key K—2 establishes contact with certain apparatus, represented by H—1, so that there flows through four trunk conductors, connecting the dispatcher's office and the station, a combination of direct and alternating currents corresponding to a code assigned to the said apparatus unit, and hereinafter termed the transmitting code. This code is received at the station by selective means SEL—2 which discriminate between the apparatus units on the basis of the code received, so that relay M—2 operates, and in turn operates relay N—2, associated with apparatus Unit No. 2. The relays M—2 and N—2 control the connections between the control wire and the various devices constituting the apparatus Unit No. 2.

After a short time interval relay REC at the office and relay SW at the station are automatically operated. Relay REC transfers the trunk circuits from key K—2 at the office to selective means SEL—1 similar to SEL—2 at the station, and switch SW transfers the trunk circuits from the selective means SEL—2 at the station to the control wire which in turn is connected to the contacts of relay N—2 and M—2 in their operated positions. This latter relay has its springs arranged to establish circuits with apparatus H—2 so that there flows through the trunk conductors a combination of direct and alternating currents, hereinafter referred to as the receiving code, to operate the selective means SEL—1 at the office to indicate whether apparatus Unit No. 2 has actually been selected. This code causes relay R—2 to operate if apparatus Unit No. 2 has been selected.

After a short time interval, relay M—2 releases and relay TRN at the office is energized. This results in the operating, metering and indicating circuits at the station being connected through the several relay contacts, the control wire and the trunk conductors to their associated switches, meters and signal lamps at the office. The dispatcher then can open and close the oil switch of apparatus Unit No. 2 while he has before him an indication of the exact switch position, and also can adjust the voltage and perform other similar adjustments while obtaining an indication of the circuit voltage.

Relay R—2 and key K—2 are inter-connected so that relay R—2, and only it, can be operated by the receiving code. Should relay R—2 fail to operate within a predetermined interval of time, thereby indicating that the proper selection has not been made, the control equipment becomes inoperative and an auxiliary alarm circuit is completed to notify the dispatcher of the condition.

In practicing my invention, the transmitting and receiving codes preferably are so different that the usual trunk conductor troubles from grounds, crosses, induction or open circuits do not normally result in an erroneous selection at the station and the false receipt by the office of the proper receiving code.

The release of switch K—2 causes the control equipment at both the station and office to restore to its normal condition.

As stated above, it is desirable for an automatic operation of a circuit breaker or similar mechanism at the station to be indicated at the dispatcher's office. To illustrate this operation, assume that the control equipment is in its normal position and the oil switch shown associated with apparatus unit K—2 at the station automatically opens its circuit. This causes relay M—2 to operate, which in turn causes relays N—2 and SW at the station and REC at the office to operate. Under this condition, as described before, the receiving code is transmitted from the station to the office, causing relay R—2 to be selected. After a time interval, relay M—2 releases and relays IN and TRN operate, causing the indicating circuits at the station to be associated with the indicating lamps at the office. After a sufficient time interval has been allowed for the registration of the switch position, the control equipment automatically restores itself to its normal condition.

As a protection against an erroneous switch operation due to trunk line trouble under the condition described just above, the operating circuits to all switches are maintained open while the control circuits are being held under the control of the station, permitting the indication of circuit conditions but preventing inadvertent operation of any of the apparatus associated with the station power circuits.

As will subsequently be described, the selective principle employed in my invention normally limits the selectable station apparatus units to thirty-one. I have provided, however, means whereby it is feasible to control and operate several multiples of approximately this many units with one group of selective equipment. In providing this expanded capacity I employ certain auxiliary relays whose operation is dependent upon the selective functions and may best be described by again referring to Fig. 1, which outlines the principle of a system for providing the control and operation of 60 units subdivided into what will hereinafter be termed a primary and a secondary group of 30 units each.

Assume that it is desired to control apparatus Unit No. 102, which is in the secondary group. The operation of key K—102 sends out the proper code for the selection of Unit No. 102, but precedes it by a code impulse which causes relay G to operate and thereby transfer the selective circuits at the stations to the secondary group of apparatus units, not shown, and causes the relays individual to the selected apparatus unit in the second group to operate. After an interval, relay REC at the office operates to transfer the trunk circuits to the selective means SEL—1. At the station relay SW operates to connect the trunk conductors to the individual relays of the selected unit. These relays cause the receiving code combination corresponding to the selected unit to be transmitted to the office. The unit receiving code, however, is preceded by a code impulse to indicate the selected apparatus unit is in the secondary group. This impulse causes relay GRP to operate and transfer the operating circuits at the office from the primary to the secondary group. When the code corresponding to the selected unit is received at the office the proper office unit relay operates to connect the operating switches, meters and signal lamps to the trunk conductors, provided, of course, that the aforesaid automatic checking means have been satisfied. The operation of relay TRN will then complete the circuits between the station unit and the control facilities at the office.

The automatic operation of a circuit breaker in the secondary group at the office will be indicated at the office by means similar to those described, the unit receiving code corresponding to the selected unit being transmitted from the station after the group code impulse has been transmitted.

The apparatus and circuits which have been described and shown in Fig. 1 represent only certain elements required by my invention and their arrangement in some instances is only approximate, since it is my purpose in the above description to give a general view of the broad operating principle, and the following relates to the details of one apparatus and circuit arrangement embodying my invention.

The circuit arrangements shown in Fig. 4 provide for four trunk conductors, T—1 through T—4 inclusive, which connect the dispatcher's office with the station. Since one of these trunk conductors is employed for a common return it would be feasible to use three trunk conductors with a grounded return. Each of the trunk conductors, excepting the common return, is "composited" in the familiar manner employed in telephone and telegraph practice whereby a conductor can simultaneously be a part of an alternating current telephone circuit and an independent direct current telegraph circuit. With three trunk conductors so arranged and a common return, six independent circuits can be procured, three of which will be direct and three alternating current. One of the direct current paths is reserved for holding while the other five paths are employed with the selecting, operating, indicating and metering functions.

The composite set required for each of these conductors comprises in its essential, a condenser which permits alternating current to flow between a local circuit and the trunk conductor, while not permitting the passage of direct current, and an inductance or reactance which permits direct current to flow between a local circuit and the trunk conductor while not permitting the passage of an appreciable amount of alternating current due to the high impedance offered thereto. In Fig. 4, L—1 for example represents an inductance through which direct current flows to and from the trunk conductor T—1, while C—1 is the condenser element for the alternating current circuit. In the communication art it is the practice to employ certain auxiliary condensers, inductances and resistances better to effect the separation of the two types of current, and in practicing my invention I may also elect to make such use of them.

In practicing my invention instead of the application of composite equipment herein shown, I may elect to use the arrangement widely employed in the telephone art whereby four conductors can be arranged into a phantom group to afford three ungrounded alternating current circuits and, by means of composite sets on each conductor and the use of ground return, to procure four additional direct current circuits, or a total of seven circuits. Such a phantom arrangement is described on pages 672–674 of the revised edition of "Telephony" by McMeen & Miller. The application of my invention herein described requires a total of six circuits, and the employment of the phantom group scheme will permit the realization of an additional control circuit between the office and the station over that specifically described.

It is well known in the printer telegraph practice that thirty-one selections can be procured by operating five relays in various combinations. The selective principle of my invention is based upon the use of such a five unit code comprising combinations of the three alternating and two direct current paths heretofore described, in such a manner that the relays shown in Fig. 2 will be made to operate in the aforesaid combinations to effect selections of local circuit elements through their chain contacts.

In order to simplify the disclosure I have shown, in the circuit diagrams, relays A through E, inclusive, as being operated directly from the trunk conductor circuits. In practicing my invention I may elect to interpose auxiliary relays between the relays A through E, inclusive, and the trunk conductors in such a manner that these auxiliary relays would operate from current in the trunk conductors to complete local circuits at their contacts to effect the operation of relays A through E inclusive.

The general circuit principles and apparatus herein described to effect the aforesaid supervisory and other operations employs a group of conductors at both the office and the station to form control wires to which the control, metering and indicating circuits for each apparatus unit can be selectively associated at the station and to which the corresponding facilities for control, metering and indicating can be associated at the office. When the selective functions have properly been completed, the wires at the station and the control wires at the office are connected together and the supervisory control operations can be carried out. At the office the control wires are divided into two parts, each being respectively related to the selective and the operative functions, and will hereinafter be termed the selecting wires SB and the operating wires OB.

By reference to Fig. 5, keys K—2 and K—102, which are preferably of the locking type, are arranged to connect to the selecting wires SB the code required to select their corresponding apparatus units at the station. Relays R—2 and R—102 are arranged when operated to associate their respective operating, metering and indicating equipment with the operating wire OB. Relay R—2 is associated with key K—2 so that upon the operation of key K—2 by the dispatcher to effect the selection of apparatus Unit No. 2 at the station, the actual selection of that unit causes relay R—2 to operate. Relay R—102 is similarly associated with key K—102.

As heretofore stated the application of my invention which I have assumed for the purpose of description has a capacity of sixty apparatus units at the station, i. e., sixty selections. Since the code employed requires that selections be made in multiples of approximately thirty apparatus units, two groups of units are required. Key K—2 and its associated relay R—2 are typical of those required for the primary group of thirty units, while key K—102 and relay R—102 are typical for those required for the secondary group of thirty units. Relay CDE is common to the secondary group of keys and has for its purpose the transmittal to the station of a group code to restrict selections to the secondary group of units. The two group relays designated GR—1 and GR—2, which do not have all of their springs shown, normally connect the operating circuits for the several relays having functions similar to relays R—2 and R—102 directly to the selective means for control operations originating at the station. For control operations originated by the dispatcher, however, these two relays are automatically operated to transfer the operating circuits for relays such as R—2 and R—102 through contacts of their associated keys as an element of the checking operation to be described later.

With reference to Fig. 4, relay REC in its normal position maintains the trunk circuit connected to the selecting wires SB. A predetermined time interval after a control operation has been initiated by the dispatcher, the relay REC transfers the trunk circuits to the springs of the transfer relay TRN, which in its normal position extends these circuits to the relays comprising the selecting means SEL—1 so that the receiving code returned from the station can effect the selection of the relay corresponding to relays R—2 and R—102. When the relay TRN is energized, it transfers the trunk circuits to the operating wires OB.

Relay GRP, with only a portion of its springs shown, restricts the selections at the office to either units in the primary or secondary groups, depending, respectively, upon whether the relay is in its normal or operated position. The relay GRP operates when the secondary group code is received by the selective means SEL—1 from the station.

Relay ON operates to effect certain circuit connections when the control system is being held either by the dispatcher or the automatic means at the station.

Relay HLD operates to cause the station apparatus to return the receiving code for the selected unit after the transmitting code has been transmitted for a predetermined time interval.

Relays CK—1, CK—2 and CK—3 relate primarily to certain automatic checking and timing features on control operations initiated by the dispatcher whereby the control equipment is automatically made inoperative after the elapse of a time interval unless the selective features have operated to make the proper selections.

Relay OUT is energized on operations initiated by the dispatcher to transfer a holding control circuit over trunk T—3 to the station from the winding of relay IN to a spring of relay HLD.

Relays IN and IN—I operate over circuits from the station to seize and control the supervisory apparatus when the automatic operation of a power equipment unit occurs therein.

The circuit arrangement provided at the station and shown in Figs. 6 and 7 is broadly similar to that required at the office. Referring to Fig. 7, relays N—2 and M—2 are typical of the thirty similar relays required in the primary group to connect the supervisory control apparatus associated with each unit with the control wires CB, while relays M—102 and N—102 are typical of those required for the secondary group.

Relays U—I and U—2 are respectively associated with the primary and secondary groups to prevent more than one apparatus control unit becoming associated with the control wires CB under the condition of the control equipment being held by the station apparatus incident to the automatic operation of an apparatus unit.

Relay G—2 is common to the secondary group and, when deenergized, is arranged to transmit to the office the secondary group code impulse after any apparatus unit in the secondary groups has been selected or has changed its position. The relay G—2 is energized under this condition but has a slow operating characteristic so that the group code impulse is transmitted for only a short period of time.

In order to indicate the operating characteristics of the relays, arrows are shown which indicate the direction in which the contacts have a delayed movement.

Referring now to Fig. 6, relay G, which is slow releasing, relates to the restriction of selections by the selective means SEL—2 to either the primary or secondary group, the former resulting from it being in its normal position. This relay operates from the selective means SEL—2 incident to the receipt by the station of the secondary group code from the office. All of its springs for a sixty unit system are not shown in the figure.

Relay SW, when energized, transfers the trunk circuits from the selecting means SEL—2 to the control wires CB. Relay BRK, which is slow releasing, is energized for a short interval during certain switching operations to disconnect the control wires CB from the trunk conductors.

Relays P and P—I, the latter being slow releasing, provide means for holding and controlling the supervisory control apparatus for operations originated by the dispatcher. The former is polarized and normally maintains its armature in its middle position. Relay SCZ operates when the selective means SEL—2 is operated to select one of the apparatus units. It has a slow releasing characteristic.

Relays PRI and SEC operate respectively to start the functioning of the supervisory control means when a power equipment unit automatically operates in the primary and secondary groups. Relay SEC is slow operating in comparison with relay PRI. Relay AUTO, which is slow releasing, operates from circuits completed by the operation of either relay PRI or SEC, and consequently is also related to the automatic operation of equipment units.

Relays S—I, S—2, S—3 and RB form a timing group, the elements of which automatically operate in combinations to effect control circuit changes which are primarily required in connection with the transmission to the office of indications of automatic operation of the apparatus units. These relays are both slow operating and slow releasing.

In the several drawings there have been indicated for both the office and station circuits a plurality of battery and alternating current generator symbols. Only one of each class of power supply is contemplated at each location, and the apparatus requiring a source of energy will be connected to these. Two types of battery supply are required, one for the entirely local circuits, which is indicated as grounded, while the other is for the purpose of transmitting certain polarized impulses over the trunk conductors. Where ground potential between the office and station will permit, and where it will otherwise be satisfactory to use grounded circuits, it is contemplated that a single battery will be employed, with positive and negative branches.

The operation of my invention having been broadly outlined and the apparatus shown in the drawings having been described in general, its detailed circuit operation will now be explained. For this purpose, it will be assumed that the dispatcher desires to measure and adjust the voltage of power circuit PR at the station by means of the induction regulator REG and to close the circuit breaker OS, which is associated with apparatus Unit No. 2. To accomplish this, the dispatcher operates the key K—2, thereby causing several circuits to be completed through its springs.

The sending code allotted to cause the selection of apparatus Unit No. 2 at the station requires that jumpers 501, 503 and 504 be connected to the springs of the key as indicated, and with the key in its operated position, an alternating current voltage from generator AC will be impressed upon conductors 113 and 114 and a direct current voltage from the battery will be impressed upon conductor 110. Since relay REC of Fig. 4 is in its normal position the direct current voltage impressed on conductor 110 will cause direct current to pass through the inductance L—I of the composite set to trunk conductor T—I, and thence to the station. Likewise, the alternating current voltages impressed on conductors 113 and 114 will respectively cause alternating currents to pass through condensers C—2 and C—3 of the composite sets to trunk conductors T—2 and T—3, and thence to the station. These circuits will be completed through certain apparatus at the station, the return trunk conductor T—4 to the battery and generator.

The operation of key K—2 also causes a local circuit to be extended from battery at spring 505 to conductor 115, where it divides, part of the current going to apparatus in Fig. 4 while the remainder causes relays GR—I and GR—2 to operate and remain operated as long as key K—2 is maintained in its operated position. The current in conductor 115 also causes relay OUT to operate on a circuit from battery on conductor 115 as above described, the winding of relay OUT to ground at the back contact of relay IN—I. The operation of relay OUT transfers a holding circuit through L—3 and trunk conductor T—3 from the winding of relay IN to a spring of relay HLD. The upper winding of relay ON, which has a slow operating characteristic, also is energized by the closing of spring 505 of key K—2.

The operation of relay ON after a time delay, causes relays REC and HLD to operate after a time interval due to their characteristics. The circuit of relay REC is from ground at the inner upper front contact of relay ON, through the lower winding of relay REC to battery. The circuit of relay HLD is from battery on conductor 115, through the inner lower front contact of relay ON, the winding of relay HLD to ground at a back contact of relay IN—1. Relay HLD operates after a time delay and in so doing causes negative battery to be extended from a back contact of relay CK—3, through a front contact of relay HLD, the front contact of relay OUT, through inductance L—3 to trunk conductor T—3 and thence to the station.

The functions described just above are incident to transmitting the code of the desired circuit unit to the station. The operation of relay REC disconnects the trunk conductors T—1 to T—3 from the control wires CB and consequently from key K—2. Since the operation of relay ON controls the operation of relay REC, the code will be transmitted to the station for the interval represented by the sum of the times required for relays ON and REC to operate. This interval is sufficient for the station selections to be made. The transmittal of negative battery to the station over trunk conductor T—3 as a result of the operation of relay HLD described above causes the station apparatus to transmit back to the office the code of the circuit unit actually selected as will hereinafter be described.

As a result of the operation of the key K—2 at the office, the direct current which flows through the trunk conductor T—1 causes at the station the energization of relay A—2 of the selective means SEL—2, and the alternating currents through the conductors T—2 and T—3, respectively, cause the energizations of the relays D—2 and E—2 of the selective means SEL—2. The currents through these several relays return to the sources at the office through the common return trunk conductor T—4.

The simultaneous operation of the relays A—2, D—2 and E—2 of the selective means SEL—2 completes, through the chain of relay springs of the selective means, a circuit for the relays M—2 and SCZ. This circuit is from the ungrounded side of the battery through the lower winding of the relay M—2, conductor 602, a back contact of relay G, terminal 62 and contacts of the selective means SEL—2 (see Fig. 2), winding of relay SCZ to the grounded terminal of the battery. This circuit causes the relays M—2 and SCZ to operate. The relay M—2 completes a locking circuit for its upper winding through the resistor W—2 and a front contact of the relay M—2. The energization of the relay M—2 also completes an energizing circuit for the relay N—2. This circuit is from the ungrounded side of the battery through the upper winding of the relay N—2, a front contact of the relay M—2, conductor 602, a back contact of relay G, terminal 62 and contacts of the selective means SEL—2 (see Fig. 2), winding of relay SCZ to the grounded side of the battery. The relays M—2 and N—2 when energized connect the receiving code sending means associated with the selected equipment Unit No. 2 to the control wires CB so that when these control wires are connected to the trunk conductors T—1, T—2 and T—3 a receiving code is transmitted to the selector SEL—1 at the office. The proper receiving code is obtained by connecting certain springs of the relay M—2 to a source of direct current and other springs to a source of alternating current in a manner similar to that described in connection with key K—2. The receiving code, assumed for the equipment Unit No. 2, requires that only alternating current be transmitted to the office selector SEL—1 over trunk conductors T—2 and T—3. This result is obtained by connecting the springs 704 and 705 of the relay M—2 to the alternating current generator so that an alternating current voltage is impressed upon the conductors 83 and 84 through the springs of the relays M—2 and N—2 when both of these relays are energized.

The relay N—2 when energized also completes through one of its front contacts an energizing circuit for the relay U—1.

After the key K—2 is depressed and until the relay REC at the office operates in the manner heretofore described to disconnect the trunk conductors T—1, T—2 and T—3 from the selecting wires SB, the above traced circuits for the relays M—2, N—2 and SCZ remain completed. When the relay REC operates to disconnect the trunk conductors from the selecting wires SB, the relays A—2, D—2 and E—2 of the selective means SEL—2 become deenergized so that the circuit through the terminal 62 of the selective means is interrupted. The opening of this circuit does not effect the deenergization of the relay M—2 since the above traced holding circuit through the lower winding of the relay is still completed. The relays N—2 and SCZ are deenergized, however, but due to their time delay characteristics they do not open their contacts until after they have been deenergized for a predetermined length of time. The time delay of the relay SCZ, however, is shorter than the time delay of the relay N—2 so that the relay SCZ releases to close its back contacts before the relay N—2 opens its front contacts.

When the relay HLD at the office operates in the manner above described to connect the negative battery across the trunk conductors T—3 and T—4, current flows through the polarized relay P at the station in a direction to cause this relay to close its front contact which is indicated by a negative sign. The circuit of the polarized relay is from the negative terminal of the negative battery through a back contact of the relay CK—3, and the heretofore traced circuit to trunk conductor T—3, then through inductance L—23, a back contact of the relay AUTO, winding of polarized relay P, to the common return conductor T—4 which is connected to the positive terminal of the negative battery. The operation of the relay P completes an obvious energizing circuit for the upper winding of relay P—1. The energization of the relay P—1, which occurs before relay N—2 has time to open its front contacts, completes a locking circuit for the relay N—2 immediately after relay SCZ closes its back contacts. This locking circuit is from the ungrounded side of the battery through the lower winding of the relay N—2, a front contact of the relay N—2, conductor 86, a front contact of the relay P—1, a back contact of the relay SCZ to the grounded side of the battery. Therefore relays M—2 and N—2 remain operated after the relay P—1 becomes energized.

The relay P—1 also completes an energizing circuit for the relay SW to effect the disconnection of the selective means SEL—2 from the trunk conductors T—1 to T—3, inclusive, and the connection of the control wires CB to the trunk conductors T—1 to T—3, inclusive. The circuit of the relay SW is from the ungrounded side of the battery through the winding of the relay SW, a front contact of the relay P—1, a back contact of the relay SCZ to the grounded side of the battery.

When the relay SW is energized, the receiving code is transmitted over the trunk conductors to the selective means SEL—1 which is now connected to the trunk conductors by the energized relay REC and the deenergized transfer relay TRN at the office. The receiving code which is transmitted to the selective means SEL—1 effects the selective operation of the relays A—1 to E—1 inclusive of the selective means SEL—1. For reasons heretofore described the code transmitted to indicate the actual selection of a given equipment unit is substantially different from that transmitted to the station to select the unit. For the purpose of this description it has been assumed that the receiving code for the apparatus Unit No. 2 consists of alternating current flowing simultaneously through the trunk conductors T—2 and T—3. Consequently, when the Unit No. 2 is selected at the station, the relays M—2 and N—2 are so connected in a manner heretofore described that alternating current is transmitted to the office through the trunk conductors T—2 and T—3. The composite sets at the office cause these alternating currents to flow respectively through the condensers C—2 and C—3, front contacts of the relay REC, back contacts of the relay TRN, the windings of the relays D—1 and E—1 to the common return trunk conductor T—4.

From Fig. 2 it will be seen that the simultaneous energization of the relays D—1 and E—1 establishes a connection to terminal 8 of the selective means SEL—1. Therefore, when the receiving code of apparatus Unit No. 2 is received at the office a circuit is completed for the relays R—2 and CK—3. This circuit is from the ungrounded side of the battery through the terminal 8 of the selective means SEL—1, back contact of the relay GRP, conductor 133, a front contact of relay GR—1, contact springs 506 of the key K—2, upper winding of relay R—2, conductor 125, either the back contacts of relay CK—2 or the series-connected front contacts of relay CK—1 and CK—2, upper winding of relay CK—3, front contact of relay ON to the grounded side of the battery. The relay R—2 by closing one of its front contacts, completes a holding circuit for its lower winding through conductor 126 and a front contact of the relay ON. The relay CK—3 completes a locking circuit for its lower winding from the ungrounded side of the battery through the lower winding of the relay CK—3, a front contact of the relay CK—3, a front contact of relay HLD, a back contact of the relay IN—1 to the grounded side of the battery. Therefore relays R—2 and CK—3 remain energized after the selective means SEL—1 is restored to normal.

The energization of the relay R—2 connects the office control, measuring and indicating apparatus for the equipment Unit No. 2 to the operating wires OB at the office. These operating wires OB are normally disconnected from the trunk conductors and are arranged to be connected thereto when both of the relays REC and TRN are energized. The relay TRN is arranged to be energized in response to the energization of the relay CK—3. Therefore as soon as the relay R—2, which is associated with the depressed key K—2 is energized, the relay TRN is energized to effect the disconnection of the selective means SEL—1 from the trunk conductors and to effect the connection of the operating wires OB to the trunk conductors.

If, because of some fault or irregularity, an erroneous selection is made at the station in response to the operation of the key K—2, the receiving code returned to the office causes the selective means SEL—1 to attempt to extend a circuit to a relay other than R—2. Since, however, only key K—2 will be in its operating position, the aforesaid attempt to energize the wrong relay will not be successful, because no other relay corresponding to R—2 will be energized due to the fact that its circuit will be open at the corresponding key which has not been depressed. The dispatcher is assured, by this feature, that the controlling, indicating and measuring facilities at the office for a given unit at the station are actually connected to the circuits corresponding to that unit at the station. If the proper unit is not selected, certain alarm and lamp circuits are completed in a manner hereinafter described so as to indicate to the operator that the proper unit has not been selected.

The energization of the relay CK—3, in addition to effecting the energization of the relay TRN, also disconnects the negative battery from across the trunk conductors T—3 and T—4 and connects the positive battery thereacross. This reverses the direction of current flow through the trunk conductor T—3 and the polarized relay P so that the polarized relay P opens its front contact and closes its back contact which is indicated by a positive sign.

The completion of the circuit through the back contact of the relay P completes a circuit for the lower winding of the relay P—1. Due to the fact that the relay P—1 has a slow release characteristic, it maintains its armature in its operated position while the relay P is opening its front contacts and closing its back contacts. The circuit of the lower winding of the relay P—1 includes a back contact of the relay AUTO.

The relay P by closing its back contact also completes an energizing circuit for the relay RB. This circuit is from the ungrounded side of the battery through the upper winding of the relay RB, the back contact of the polarized relay P to the grounded side of the battery. The back contact of the polarized relay P also completes through a back contact of the relay RB an energizing circuit for the relay BRK. The energization of the relay BRK disconnects the trunk conductors T—1, T—2 and T—3 at the instant when the trunk circuits are being changed from the code transmitting means at the station to the equipment controlling apparatus. This is provided for practical reasons to insure a proper interval for a similar transfer of circuit conditions at the office before allowing the power equipment operating circuits to be connected to the trunk conductors in the station. The operation of the relay RB interrupts the energizing circuit of the relay BRK and after a predetermined interval the relay BRK reconnects the trunk conductors T—1, T—2 and T—3 to the control wires CB.

The energization of the relay RB also, through one of its front contacts, conductor 85 and a front contact of relay N—2, completes a shunt circuit around the upper winding of the relay M—2 so that the relay M—2 is deenergized to cause the control circuits for the equipment unit No. 2 to be associated with the control wires CB and, therefore, through the front contacts of the relay SW to the trunk conductors and thence to the office. These conditions are maintained as long as the dispatcher desires to maintain control of the equipment Unit No. 2.

It will be seen now that with the relay N—2 energized and the relay M—2 deenergized, the control apparatus for measuring, operating and controlling the equipment Unit number 2 is connected to the control wires CB which, as previously described, are connected to the trunk conductors. Likewise, at the office the corresponding measuring, operating and controlling apparatus for Unit No. 2 is connected to the trunk conductors by the relays R—2, TRN and REC and under these conditions the supervisory control may be directly accomplished by the dispatcher.

The oil switch OS, which is representative of circuit breakers and similar apparatus, is shown in its open position and it is assumed that the dispatcher desired to close it. In order to do this, he operates the switch OS—K shown in Fig. 5 to cause alternating current to flow through contact 521 of the switch OS—K, a front contact of the relay R—2, conductor 121, a front contact of relay TRN, a front contact of relay REC, condenser C—1, trunk conductor T—1, a back contact of relay BRK, condenser C—21, a front contact of relay SW, conductor 81, a front contact of relay N—2, a back contact of relay M—2, winding of relay SW—C to the common return conductor T—4. Under this condition, relay SW—C operates and completes an energizing circuit for the closing coil of the oil switch. This circuit is from the ungrounded side of the battery through an auxiliary switch 722 on the oil switch, the closing coil, the front contact of relay SW—C, conductor 87, a front contact of relay P—1 to the grounded side of the battery. This causes the oil switch to close and in so doing it interrupts, at its auxiliary contacts 722, the above traced circuit for the closing coil.

If it is desired to open the oil switch OS, the dispatcher operates the switch OS—K so that it engages its upper contacts 522 and thereby connects the relay SW—O at the station across the source of alternating current. The circuit of the relay SW—O is from side of the source of alternating current AC, through the contacts 522 of the switch OS—K, a front contact of the relay R—2, conductor 123, a front contact of the relay TRN, a front contact of the relay REC, condenser C—2, trunk conductor T—2, a back contact of relay BRK, condenser C—22, a front contact of relay SW, conductor 83, a front contact of relay N—2, a back contact of relay M—2, winding of relay SW—O to common return conductor T—4 which is connected to the other side of the source of alternating current AC. Relay SW—O by closing its front contact completes an energizing circuit for the trip coil of the oil switch OS to effect the opening thereof.

When the oil switch OS is open, as shown in the drawing, the auxiliary switch 721 on the oil switch connects the polarized relay SIG at the office across the negative battery so that the relay SIG completes the circuit for the green signal lamp G. This circuit of the relay SIG is from the negative terminal of the negative battery through the auxiliary switch 721 on the oil switch, a back contact of the relay M—2, a front contact of the relay N—2, conductor 80, a front contact of the relay SW, inductance L—21, a back contact of relay BRK, trunk conductor T—1, inductance L—1, a front contact of relay REC, a front contact of relay TRN, conductor 120, a front contact of relay R—2, winding of relay SIG to the common return conductor T—3 which is connected to the positive terminal of the negative battery. Relay SIG maintains its armature in the position to which it has last been operated when it is dissociated from the station apparatus circuits.

When the oil switch OS is closed, the auxiliary switch 721 is operated so that it disconnects the winding of the polarized relay SIG from the negative battery and connects it across the positive battery. The current through the relay SIG, therefore, reverses so that the armature of the relay opens its front contact and closes its back contact. Therefore, circuit of the green signal lamp G is opened and the circuit of the red signal lamp R is completed, thereby indicating to the dispatcher that the oil circuit breaker in the equipment Unit No. 2 is closed. When the oil switch OS is opened again the relay SIG operates in the manner above described to open the circuit of lamp R and complete the circuit of lamp G.

A voltmeter V is shown associated with the Unit No. 2 at the station and its reading is arranged to be transmitted to the dispatcher at the office. This is accomplished by associating with the voltmeter V a suitable repeating means 731 which generates an alternating current voltage having a frequency which bears a predetermined relation to the indication of the voltmeter V. The frequency thus generated is transmitted to the office over the trunk conductor T—3 and causes the indicating needle of a suitable frequency responsive device V—1 at the office to assume a position which depends upon the frequency generated by the repeating device 731. Device V—1 is calibrated to indicate the same quantitative units as the meter V so that the meter indication at the office is in the same units as the meter indication at the station. This arrangement which is described in my Patent 1,786,780 is typical of any measuring means which may be required in the operation of a power or other station and includes, in addition to voltage, the measurement of current, power, gate opening, temperature, water level, etc.

It is often desirable to control remotely certain control apparatus at the station such as a gate, a motor, a field rheostat, etc. The induction regulator REG in Fig. 7 has been shown as an example of such a remote controlled device, for the purpose of describing this application of my invention. At the office a key RC is provided for controlling the position of the regulator REG at the station. When the key RC is moved to its upper postion, the negative battery is connected across the trunk conductors T—2 and T—4 so that the polarized relay RR at the station is energized in a manner to close its upper contact. The circuit of relay RR is from the negative terminal of the negative battery through the upper contact of the switch RC, a front contact of the relay R—2, conductor 122, a front contact of the relay TRN, a front contact of the relay REC, inductance L—2, trunk conductor T—2, a back contact of relay BRK, inductance L—22, a front contact of relay SW, conductor 82, a front contact of relay N—2, a back contact of relay M—2, winding of the polarized relay RR to the common return conductor T—4 which is connected to the positive terminal of the negative battery. The relay RR by closing its front contact, completes, through conductor 87 and a front contact of relay P—1, an energizing circuit for the regulator driving motor M so that the regulator is adjusted to increase the voltage impressed across the voltmeter V.

Likewise, the movement of the key RC at the office to its lower position connects the positive battery across the conductors T—2 and T—4 so that the polarized relay RR at the station closes its other contact and thereby causes the direction of rotation of the regulating motor M to be reversed. In this manner the regulator REG is adjusted so as to decrease the voltage impressed across the voltmeter V. Since the meter V—1 at the office indicates to the dispatcher the voltage of the power circuit at the station, he can adjust the voltage by means of the induction regulator to any desired value. This is typical of the broad general application of this feature of my invention.

While I have shown specific arrangements as regards the power equipment elements which are metered, regulated, operated and indicated, it is obvious that various other combinations can be provided for each separate selection as desired.

When the dispatcher desires to restore the apparatus to normal, he releases key K—2 so that it returns to its normal position. This results in the disconnection of the battery from conductor 115. Consequently the relays GR—1, GR—2, ON and OUT are deenergized. These, in turn, effect the deenergization of the relay REC, HLD, CK—3. The deenergization of the relay HLD opens the holding circuit through the trunk conductor T—3 for the polarized relay P at the station so that its armature is restored to its middle position thereby effecting the deenergization of the relay P—1 which in turn effects the deenergization of relays SW, N—2 and U—1 so that they are restored to their normal positions. The deenergizations of the relays REC and SW effect the reconnection of the trunk conductors to the selecting wires SB at the office and the selector SEL—2 at the station.

If in the above operation the proper code is not returned to the office within a predetermined time after a key is depressed, the operating wires OB at the office are prevented from being connected to the trunk conductors T—1 to T—3. In the particular embodiment of my invention shown in the drawing, this result is accomplished by means of the relays CK—1 and CK—2 which, in conjunction with relay CK—3, constitute a time measuring arrangement to permit the station apparatus to transmit the proper selecting code within a predetermined time. If, however, the proper code is not received within that time, an indication is given that the wrong equipment unit at the station has been selected, and also the relays operate to render the supervisory apparatus inoperative.

As previously described, the relay HLD is energized after a key at the office has been depressed for a predetermined length of time. The operation of the relay HLD, in addition to connecting negative battery across the trunk conductors T—3 and T—4, also completes an energizing circuit for the upper winding of the relay CK—1. This circuit is from the ungrounded side of the battery through the upper winding of the relay CK—1, a normal contact of relay CK—1, a back contact of relay CK—2, a back contact of relay CK—3, a front contact of relay HLD, a back contact of relay IN—1 to the grounded side of the battery. Relay CK—1 has both a slow operating and a slow releasing characteristic. After the upper winding of the relay CK—1 has been energized for a predetermined length of time, the relay CK—1 operates and completes an energizing circuit for the lower windings of the relay CK—1 and CK—2. This circuit is from the ungrounded side of the battery through the parallel-connected lower windings of the relays CK—1 and CK—2, a front contact of the relay CK—1, a back contact of the relay CK—2, a back contact of relay CK—3, a front contact of the relay HLD, a back contact of the relay IN—1 to the grounded side of the battery. Relay CK—2 also has a slow operating and a slow releasing characteristic. After the lower winding of the relay CK—2 has been energized for a predetermined length of time, the relay CK—2 operates and opens the above traced circuit for the lower windings of the relays CK—1 and CK—2 and completes a circuit for the upper winding of the relay CK—2. This circuit is from the ungrounded side of the battery through the upper winding of the relay CK—2, a front contact of the relay CK—2, a back contact of the relay CK—3, a front contact of the relay HLD, a back contact of the relay IN—1 to the grounded side of the battery. Due to the time delay characteristic of relay CK—1, it does not return to its normal position until after the relay CK—2 has been operated for a predetermined length of time. The sequence of operation of these relays, therefore, is as follows: First the relay CK—1 operates, then relay CK—2 operates while relay CK—1 remains operated, and then relay CK—1 is restored to its normal position while the relay CK—2 remains operated. If the equipment unit at the station corresponding to the depressed key has been selected, the relay CK—3 is energized and locked in its energized position in a manner heretofore described before the relay CK—1 is restored to its normal position after the relay CK—2 is energized in the manner above described. If, however, the proper unit is not selected and, therefore, the relay CK—3 is not energized before the relay CK—1 is restored to its normal position while the relay CK—2 is energized, the operating winding of the relay CK—3 is disconnected from conductor 125 by the relay CK—1 so that the subsequent operation of relay CK—3 cannot take place even though the proper receiving code is subsequently received. Since the operation of the relay CK—3 is necessary in order to complete the selecting operation, this opening of the circuit of the relay CK—3 renders the apparatus inoperative if the proper receiving code has not been returned to the office within a predetermined time interval.

It is desirable that the operator be advised of this abnormal condition and an alarm signal, shown as a red lamp ALM, has been provided for this purpose. Under the conditions described, a circuit is completed for the lamp ALM through a back contact of the relay CK—1, a front contact of the relay CK—2 and a back contact of the relay CK—3 if the proper code is not transmitted back to the office within a predetermined time. In practicing my invention, I may elect to provide an alarm bell in parallel with the lamp ALM to give an audible signal as well as a visible indication of trouble in the control apparatus and control circuits. When the operator receives the signal that the desired connections have not been established, he releases the depressed keys to release the various devices of the system and then again depresses the key corresponding to the apparatus unit which he wants to control.

The operation described above has been in connection with an equipment unit in the primary group of thirty units. It is possible, as outlined heretofore, to have multiples of approximately thirty units and, in order to describe this feature of my invention, it will be assumed now that the dispatcher desires to control Unit No. 102 which is in the secondary group of thirty units. To accomplish this result, the dispatcher depresses key K—102 which connects the sending code to an extension of the selecting wires SB. This extension, however, is disconnected from the selecting wires until after the key K—102 has been depressed for a predetermined length of time during which time a group code impulse is transmitted to the station to effect the operation of relay G so that the selective means SEL—2, when operated in response to the unit code, selects a unit in the secondary group. Key K—102 is provided with an additional contact which is so connected that when this key is depressed the positive battery is connected across the trunk conductors T—1 and T—4 to effect the energization of the relay A—2 of the selector SEL—2 at the station. The circuit of the relay A—2 is from the positive terminal of the positive battery through the upper contacts of the key K—102, a back contact of relay CDE, conductor 110, a back contact of relay REC, inductance L—1, trunk conductor T—1, a back contact of relay BRK, inductance L—21, a back contact of relay SW, winding of relay A—2 of selective means SEL—2 to the common return conductor T—4 which is connected to the negative terminal of the positive battery. This direct current through the relay A—2 is called the group code impulse since it is the means whereby the selective means SEL—2 is rendered operative to select a unit in the secondary group when the unit code is subsequently transmitted to the selective means. Since the relay A—2 of the selective means SEL—2 is energized before the unit transmitting code is connected to the selecting wires SB, the selective means SEL—2 first establishes a circuit through its terminal 63 (see Fig. 2) for the relay G. This circuit is from the ungrounded side of the battery through the inner winding of the relay G, terminal 63 and contacts of the selective means SEL—2, winding of relay SCZ to the grounded side of the battery. The relay G completes through one of its front contacts and a front contact of relay SCZ a holding circuit for its outer winding. The energization of the relay G transfers all of the selecting circuits at the station from the primary group to the secondary group of units.

The operation of the key K—102 also completes an energizing circuit for the relay CDE which is common to the group of keys corresponding to the secondary units. The relay CDE has a slow operating characteristic and, therefore, the above traced circuit for the relay A—2 of the selective means SEL—2 remains completed for a predetermined time after the key K—102 is depressed. When the relay CDE operates, however, the group code is interrupted and the unit code is placed on the control bus by the key K—102. This unit code then operates in the manner above described to effect the energization of the relays A—2, D—2 and E—2 of the selective means SEL—2 at the office so that a circuit is completed through the terminal 62 of the selective means SEL—2 at the station. Due to the energization of the relay G, the terminal 62 is now connected to the conductor 604 instead of 602 and, therefore, the relay M—102, instead of the relay M—2, is energized. The energization of relay M—102 effects the energization of the relay N—102 in the same manner that relay M—2 effected the energization of the relay N—2. The energization of the relay N—102, in turn, effects the energization of the relay U—2. When the relay P—1 is energized after the unit transmitting code has been transmitted to the station for a predetermined time interval, the relay SW operates in the manner heretofore described to disconnect the trunk conductors T—1, T—2, and T—3 from the selective means SEL—2 and to connect the conductors to the control wires CB. The secondary control wires SCB to which the control circuits of the apparatus units of the secondary group are arranged to be connected, are not connected to the primary control wires CB until after the relay SW has been energized for a predetermined time interval. This result is accomplished by the relay G—2 which has a slow operating characteristic and which is energized when the relay SW is energized. The circuit of the relay G—2 is from the ungrounded side of the battery, through a front contact of relay N—102, winding of relay G—2, conductor 86, a front contact of relay P—1, a back contact of relay SCZ to the grounded side of the battery.

During the time it takes the relay G—2 to operate after the relay SW has operated, the group code impulse is transmitted to the selective means SEL—1 at the office to effect the energization of the group relay GRP so that when the receiving unit code of the selected unit in the secondary group is subsequently transmitted, the corresponding relay in the secondary group at the office is energized.

For the purpose of this description, it is assumed that the group code impulse for the secondary group is a direct current through trunk conductor T—2 which effects the energization of the relay C—1 of the selective means SEL—1 so that the ungrounded terminal of the battery is connected by the selective means to the terminal 64.

The energizing circuit of the relay C—1 is from the ungrounded side of the battery, through the upper front contact of the relay U—2, a back contact of the relay G—2, conductor 82, a front contact of the relay SW, inductance L—22, a back contact of the relay BRK, trunk conductor T—2, inductance L—2, a front contact of relay REC, a back contact of relay TRN, winding of relay C—1 of selective means SEL—1 to conductor T—4 which is connected to the positive terminal of the negative battery. The energization of the relay C—1 of the selective means SEL—1 completes through the terminal 64 of the selective means an energizing circuit for the group relay GRP to transfer the selective circuit at the office from the primary to the secondary group of control relays. The group relay GRP also completes through its left front contacts and a front contact of the relay ON a locking circuit for its outer winding so that the group relay remains energized after the selective means SEL—1 is restored to its normal condition.

When the relay G—2 at the station operates the group code impulse is interrupted and the unit code of the selected unit is tansmitted. In the particular case assumed this code is the same as the code which was transmitted when apparatus Unit No. 2 was selected. Therefore, it causes the selective means SEL—I, in the manner heretofore described, to connect the ungrounded side of a battery to the terminal 8, which now effects the operation of the relay R—102 instead of the relay R—2 because the group relay GRP is energized. The energizing circuit of the relay R—102 includes a contact of the key K—102 so that only the relay corresponding to the depressed key can be energized.

After the relay R—102 operates, the operating, metering and indicating circuits of Unit No. 102 are conected through the trunk conductors to their associated switches, meters and indicating devices at the office in a manner similar to that heretofore described.

An extension of this grouping arrangement will permit the use of a plurality of groups, thereby expanding the capacity of my invention above sixty units as shown. Such an arrangement results, however, in the capacity per group being reduced as the number of groups increase, since all groups above one require the reservation of one code of the thirty-one for each group selection.

A further application of the grouping arrangement permits several stations along a given trunk route to be individually controlled by assigning a group code or codes to each station. The transmittal of the code or codes for a given station will cause the selective means at all other stations to effect the continuous operation of relay BRK by means similar to the selection and operation of relay G, and to be held under control of the holding circuit over trunk conductor T—3.

The means employed by my invention to indicate to the dispatcher the operation of an apparatus unit under the control of automatic means may best be described by asuming that the oil switch OS, shown in Fig. 7, opens, for example, in response to an overload on the power circuit of which it is a part. The movement of the oil switch from the position occupied when the oil switch is closed to that occupied when it is open, causes the switch 720 momentarily to complete an energizing circuit for relay M—2. This circuit is from ground, through the auxiliary switch 720, upper winding of relay M—2, resistance W—2 to the battery. It will be noted that this operation of relay M—2 does not occur when the oil switch position is changed by the dispatcher through the means heretofore described, because under such conditions the upper winding of the relay is shunted by conductor 85 and a front contact of relay RB.

Relay M—2 by closing its lower front contacts completes a locking circuit for the upper winding of the relay. The operation of the relay M—2 also completes an energizing circuit for the relay N—2. This circuit is from the ungrounded side of the battery through the lower winding of the relay N—2, a back contact of the relay N—2, a front contact of the relay M—2 and a back contact of the relay U—1, conductor 605, lower and upper windings of relay PRI, a back contact of relay SEC, a back contact of relay P—1, a back contact of relay SCZ, a back contact of relay S—3, a back contact of relay P—1 to the grounded side of the battery. Current through this circuit causes the relay PRI to operate but, due to the high resistance of the upper winding of the relay PRI, the relay N—2 is not sufficiently energized to cause it to operate. The relay PRI by closing one of its front contacts, completes an energizing circuit for the relay AUTO. This relay AUTO, by closing one of its front contacts, completes through a front contact of the relay PRI, a back contact of relay S—3, a back contact of relay P—1 to the grounded side of the battery, a shunt circuit around the high resistance upper winding of the relay PRI. When this shunt circuit is completed by the relay AUTO, the lower winding of the relay N—2 becomes sufficiently energized to cause the relay to operate. The relay N—2 by closing one of its front contacts completes an energizing circuit for the relay U—1 which by opening its back contact and closing its front contact disconnects the lower winding of relay N—2 from in series with the lower winding of the relay PRI and connects the resistance W—1 in series between the lower winding of the relay PRI and the ungrounded side of the battery so that the relay PRI remains energized. The relay N—2, however, remains energized, since it completes a locking circuit for its lower winding through one of its front contacts, conductor 86, a front contact of the relay PRI, a back contact of the relay P—1, a back contact of the relay SCZ, a back contact of the relay S—3, a back contact of the relay P—1 to the grounded side of the battery. Since the relays M—2 and N—2 are both energized, the receiving code of Unit No. 2 is connected to the control wires CB. The control wires CB, in turn, are connected to the trunk conductors T—1 to T—3 by the relay SW, the circuit of which is completed from the ungrounded side of the battery through the winding of the relay SW, a front contact of the relay PRI, a back contact of the relay P—1, a back contact of the relay SCZ, a back contact of the relay S—3, a back contact of the relay P—1 to the grounded side of the battery.

In order to connect the selective means SEL—1 at the office to the trunk conductors T—1 to T—3 so that it may be selectively operated in accordance with the receiving code to be transmitted to the office, the relay AUTO, when it operates, connects the positive battery across the conductors T—3 and T—4 so that the polarized relay IN at the office closes its positive contact. The circuit of the relay IN is from the positive terminal of the positive battery through a back contact of the relay RB, a front contact of the relay AUTO, inductance L—23, trunk conductor T—3, inductance L—3, back contact of relay OUT, winding of polarized relay IN to the common return trunk conductor T—4 which is connected to the negative side of the positive battery. The positive contact of the relay IN, completes an energizing circuit for the lower coil of the relay IN—1 and also a circuit for the upper coil of the relay REC. The operation of the relay IN—1 completes, through one of its front contacts a circuit for the lower winding of the relay ON and also a circuit for the lamp 401 to indicate to the dispatcher that an automatic operation of one of the oil switches at the station has occurred.

After a predetermined time the relays ON and REC operate, the latter connecting the trunk conductors T—1, T—2 and T—3 to the selective means SEL—1 at the dispatcher's office so that it is operated by the receiving code of the apparatus Unit No. 2. As previously described, the receiving code of the Unit No. 2 is such that it connects the terminal 8 of the selective means SEL—1 to the ungrounded side of the battery so that an energizing circuit is completed for relay R—2. This circuit is from the ungrounded side of the battery through the contacts and terminal 8 of the selective means SEL—1, a back contact of the relay GRP, conductor 133, a back contact of the relay GR—1, upper winding of the relay R—2, conductor 125, a front contact of the relay IN—1 to the grounded side of the battery. Relay R—2 completes a locking circuit for its lower winding through one of its front contacts, conductor 126 and a front contact of the relay ON.

In order to stop the transmission of the receiving code after it has been transmitted for a predetermined time, I provide the group of timing relays S—1, S—2, S—3 and RB, all of which are slow operating and slow releasing. When the relay AUTO is operated in the manner heretofore described in response to the energization of the relay PRI, a circuit is completed for the upper winding of the relay S—2. This circuit is from the ungrounded side of the battery through a front contact of the relay AUTO, a back contact of the relay S—3, the upper winding of the relay S—2, a back contact of the relay S—2, a back contact of the relay S—1, a front contact of the relay AUTO to the grounded side of the battery. After a predetermined time the relay S—2 operates and completes a circuit for energizing the lower windings of the relay S—1 and S—2. This circuit is from the ungrounded side of the battery through a front contact of the relay AUTO, a back contact of the relay S—3, the lower parallel-connected windings of the relays S—1 and S—2, a front contact of the relay S—2, a back contact of the relay S—1, a front contact of the relay AUTO to the grounded side of the battery. After a predetermined time interval, the relay S—1 operates and completes an energizing circuit for its upper winding. This circuit is from the ungrounded side of the battery through a front contact of the relay AUTO, a back contact of the relay S—3, the upper winding of the relay S—1, a front contact of the relay S—1, a front contact of the relay AUTO to the grounded side of the battery. In operating, the relay S—1 opens the energizing circuits for the windings of the relay S—2 so that after the relay S—1 has maintained its contacts closed for a predetermined time the contacts of relay S—2 are restored to their normal position. When this occurs, an energizing circuit is completed for the upper winding of the relay RB. This circuit is from the ungrounded side of the battery through the upper winding of the relay RB, a front contact of the relay S—1, a back contact of the relay S—2 to the grounded side of the battery. Through one of its front contacts and a front contact of the relay AUTO the relay RB completes a locking circuit for its lower winding.

The receiving code to the dispatcher's office is terminated by the operation of the relay RB which reverses the battery potential connected across the trunk conductors T—3 and T—4 so that the polarized relay IN at the dispatcher's office opens its positive contact and closes its negative contact, thereby completing a circuit through the upper winding of the relay IN—1 to maintain this relay energized. The closing of the negative contact of the relay IN also completes, through a front contact of the relay IN—1, an energizing circuit for the relay TRN. The operation of the relay TRN disconnects the selective means SEL—1 from the trunk conductors T—1, T—2 and T—3 and connects these conductors to the operating wires OB which are already connected by relay R—2 to the control apparatus for the apparatus Unit No. 2.

The operation of the relay RB at the station also effects the deenergization of the relay M—2 so that the oil switch position indicating circuit is connected to the trunk conductor T—1 in order that the corresponding indicating device at the dispatcher's office may be operated in accordance with the position of the oil switch at the station. The deenergization of the relay M—2 is effected by a front contact of the relay RB which completes through conductor 85 and a front contact of the relay N—2 a shunt circuit around the upper winding of the relay M—2.

In order to maintain the circuit through the trunk conductors T—1, T—2, T—3 open after the receiving code is transmitted and until the indicating circuits are connected to the respective operating busses, a circuit is completed for the relay BRK through a back contact of the relay RB, a front contact of the relay S—1 and a back contact of the relay S—2. A predetermined time after the relay RB operates and interrupts this circuit, the relay BRK reestablishes the circuits through the trunk conductors T—1, T—2 and T—3.

As soon as the relay BRK closes its contacts, the heretofore described circuit is completed for the relay SIG at the dispatcher's office to cause this relay to interrupt the circuit of the red lamp R and close the circuit of the green lamp G thereby notifying the operator that the Unit No. 2 has been automatically opened.

In order that the apparatus at the office and at the station may be automatically restored to normal after the signalling impulse has been transmitted for a predetermined time, the relay RB is also arranged to complete the energizing circuit for the time relay S—3. This circuit is from the ungrounded side of the battery through the winding of the relay S—3, a front contact of the relay RB, a front contact of the relay S—1, a back contact of the relay S—2 to the grounded side of the battery. After a predetermined time interval the relay S—3 operates and by opening one of its back contacts it interrupts the circuit for relay S—1. With relay S—3 operated, the release of relay S—1 interrupts the circuits for the relays SW, N—2 and PRI. The release of relay PRI effects the release of relay AUTO, which, in turn, interrupts the circuits for relays RB and S—3, and the relay N—2 interrupts the circuit for relay U—1. In this manner the control apparatus at the station is restored to its normal position. In order to interrupt the circuit through the conductors T—1, T—2 and T—3 during the releasing operation a circuit is completed for the relay BRK until the relay S—3 has returned to its normal position. This circuit is from the ungrounded side of the battery through the winding of the relay BRK, a back contact of the relay S—1, a front contact of the relay S—3, a back contact of the relay P—1 to the grounded side of the battery.

At the office, after the supervisory indications have been suspended, the circuit of the relay IN is opened by the release of the apparatus at the station. The relay IN in turn effects the deenergization of the relay IN—1 and the return of these two relays to their normal positions effects the release of all of the other relays, apparatus and circuits to their normal positions.

The automatic operation of an apparatus unit in the secondary group effects substantially the same circuit operations as above described in connection with the automatic operation apparatus unit in the primary group except that the relay SEC instead of the relay PRI is energized and a group code is sent through the office before the unit code is sent. This is accomplished by relay G—2 in the same manner as previously described when this operation occurs under the control of the dispatcher.

It is possible for a plurality of oil switches in each group to operate simultaneously, and it is necessary that the supervisory control apparatus allot these units individually to the control bus and the office apparatus one at a time in a predetermined order. I will first consider this allocation as applied to units within a group. Referring to Fig. 7 it will be seen that with relay M—2 in its normal position, the start conductor circuit 605 is extended beyond relay M—2 to the next relay, not shown, and subsequent relays by means of a back contact of relay M—2. Similar contacts on the subsequent relays (not shown) therefore form a chain circuit. The operation of relay M—2 by the opening of oil switch OS interrupts this chain circuit and disconnects all the other relays of the M—2 class beyond it from access to the start circuit. This results in precedence being given to the units in the order of their arrangement in the chain circuit, and it follows that the more important power circuits would be located near the head of the chain.

Without protection further than that shown, it would be possible for a relay near the head of the chain to operate to give a double connection even though another was already associated with the control wires, and it is the purpose of relay U—I to operate when any one of the relays of the N—2 type are connected to the wires. This relay transfers the start circuit from the relay contact chain to the resistance as described, thereby effectively preventing the operation of another relay of the N—2 type as long as one of them is energized.

The primary group is given precedence over the secondary group in attempts at simultaneous operation by having the characteristics of relay PRI such that it will operate faster than the secondary relay SEC. The operating circuit of each of these relays passes through a back contact of the other, and if one operates it automatically prevents the other from so doing. Relay PRI, being the faster of the two, will always gain control of the circuits under the condition of simultaneous attempts by both, but relay SEC once operated prevents relay PRI from operating. In practicing my invention, it would also be desirable to locate the more important power circuits in the primary group.

In the event a circuit breaker in either the primary or secondary group operates either simultaneously with or during the interval required for the transmission of an indication of another breaker, the relay, corresponding to M—2, of the operated breaker becomes energized. As soon as the apparatus at the station has been restored from transmitting the indication of the preceding circuit breaker, as indicated by the release of relay S—3 or has been released by the dispatcher, relay PRI or SEC becomes energized again depending upon whether the circuit breaker which has changed its position is either in the primary or secondary group and the subsequent operation of the apparatus is as described heretofore. In this manner the simultaneous operation of a plurality of oil circuit breakers results in each one of them individually transmitting its indication to the office with precedence being given to those in the primary group and those nearest the head of the chain in this group, as described.

What I claim as new and desire to secure by Letters Patent of the United States is:

1. In a supervisory control system, a controlling station, a remote station, a primary group of devices at said remote station, a secondary group of devices at said remote station, sources of different kinds of current, primary control means at said controlling station individual to each device in the primary group at said remote station, each of said control means being arranged when operated to effect connections between said sources and said conductors whereby a current combination individual to the operated control means simultaneously flows through said conductors, secondary control means at said controlling station individual to each device in the secondary group at said remote station, each of said secondary control means being arranged when operated to effect connections between said sources and said conductors whereby first a group current combination is simultaneously transmitted over said conductors and then a current combination individual to the operated secondary control means is simultaneously transmitted, and means at said remote station selectively responsive to the current combinations flowing through said conductors for selecting the device at the remote station corresponding to the operated control means at the controlling station.

2. In a supervisory control system, a controlling station, a remote station, a plurality of conductors interconnecting said stations, a plurality of apparatus units at the remote station, each unit including an electroresponsive device, a control key at said controlling station individual to each apparatus unit, sources of different kinds of current at the controlling station, sources of different kinds of current at the remote station, means responsive to the operation of a control key for establishing for a predetermined time a connection between said sources at the controlling station and said conductors whereby a current combination individual to the operated key is simultaneously transmitted through said conductors, selective means at the remote station responsive to said current combination for selecting an apparatus unit, means at the remote station operative after said current combination has been terminated to establish a connection between said sources at the remote station and conductors whereby a current combination individual to the selected apparatus unit is simultaneously transmitted over said conductors, means at said controlling station selectively controlled by said last mentioned current combination, a control switch at said controlling station individual to each of said electroresponsive devices, and means controlled by said selective means at the controlling station and the operated control key for establishing between the electroresponsive device of the selected unit and the corresponding control switch a control circuit including one of said conductors when the apparatus unit corresponding to the operated control key has been properly selected.

3. In a supervisory control system, a controlling station, a remote station, a plurality of apparatus units at said remote station, a plurality of conductors interconnecting said stations, a selective device at the remote station normally connected to said conductors, selecting wires at said controlling station normally connected to said conductors, sources of different kinds of current, a control key at said controlling station individual to each apparatus unit for connecting said sources to said selecting wires whereby a current combination individual to each control key is transmitted over said conductors to the selective device at the remote station, and means controlled by said control keys for effecting the disconnection of said conductors from said selecting wires and said selective device after a key has been operated for a predetermined time and for effecting the transmission over said conductors of a combination of currents corresponding to the selected apparatus unit.

4. In a supervisory control system, a controlling station, a remote station, a plurality of apparatus units at said remote station, a plurality of conductors interconnecting said stations, a selective device at the remote station normally connected to said conductors, selecting wires at said controlling station normally connected to said conductors, sources of different kinds of current, a control key at said controlling station individual to each apparatus unit for connecting said sources to said selecting wires whereby a current combination individual to each control key is transmitted over said conductors to the selective device at the remote station, control wires at the remote station, control means associated with each unit for connecting said sources to said control wires in a combination individual to the associated unit, a second selective device at the controlling station, means controlled by said first mentioned selective device for selectively controlling said control means, and means operative after a key has been operated for a predetermined time for effecting the disconnection of said conductors from said selecting wires and said first mentioned selective device and the connection of said conductors to said control wires and said second selective device whereby said selective device is selectively operated by the current combination individual to the selected apparatus unit.

5. In a supervisory control system, a controlling station, a remote station, a plurality of apparatus units at said remote station, a plurality of conductors interconnecting said stations, a selective device at the remote station normally connected to said conductors, selecting wires at said controlling station normally connected to said conductors, sources of different kinds of current, a control key at said controlling station individual to each apparatus unit for connecting said sources to said selecting wires whereby a current combination individual to each control key is transmitted over said conductors to the selective device at the remote station, control wires at the remote station, control means associated with each unit for connecting said sources to said control wires in a combination individual to the associated unit, a second selective device at the controlling station, means controlled by said first mentioned selective device for selectively controlling said control means, and means operative after a key has been operated for a predetermined time for effecting the disconnection of said conductors from said selecting wires and said first mentioned selective device and the connection of said conductors to said control wires and said second selective device, operating wires at said controlling station, and means controlled by said second selective means and said control keys for establishing a connection between said operating wires and an apparatus unit when the operation of said second selective means is effected by the operation of the control means corresponding to an operated key.

6. In a supervisory control system, a controlling station, a remote station, a plurality of apparatus units at said remote station, a plurality of conductors interconnecting said stations, a selective device at the remote station normally connected to said conductors, selecting wires at said controlling station normally connected to said conductors, sources of different kinds of current, a control key at said controlling station individual to each apparatus unit for connecting said sources to said selecting wires whereby a current combination individual to each control key is transmitted over said conductors to the selective device at the remote station, control wires at the remote station, control means associated with each unit for connecting said sources to said control wires in a combination individual to the associated unit, a second selective device at the controlling station, means controlled by said first mentioned selective device for selectively controlling said control means, and means operative after a key has been operated for a predetermined time for effecting the disconnection of said conductors from said selecting wires and said first mentioned selective device and the connection of said conductors to said control wires and said second selective device, operating wires at said controlling station, and means controlled by said second selective means and said control keys for effecting the disconnection of said conductors from said second selective means and the control means of the selected unit and the connection of said conductors to said operating wires and to the apparatus of the selected unit.

7. In a supervisory control system, a controlling station, a remote station, a plurality of apparatus units at said remote station, a plurality of conductors interconnecting said stations, a selective device at the remote station normally connected to said conductors, selecting wires at said controlling station normally connected to said conductors, sources of different kinds of current, a control key at said controlling station individual to each apparatus unit for connecting said sources to said selecting wires whereby a current combination individual to each control key is transmitted over said conductors to the selective device at the remote station, control wires at the remote station, control means associated with each unit for connecting said sources to said control wires in a combination individual to the associated unit, a second selective device at the controlling station, means controlled by said first mentioned selective device for selectively controlling said control means, and means operative after a key has been operated for a predetermined time for effecting the disconnection of said conductors from said selecting wires and said first mentioned selective device and the connection of said conductors to said control wires and said second selective device, operating wires at said controlling station, and means controlled by said second selective means and said control keys for effecting the disconnection of said conductors from said second selective means and the control means of the selected unit and the connection of said conductors to said operating wires and to the apparatus of the selected unit, and means for establishing the normal connections of said conductors if they are not connected to said control wires within a predetermined time after a key is operated.

8. In a supervisory control system, a controlling station, a remote station, a plurality of apparatus units at said remote station, a plurality of controlling and indicating devices at the controlling station corresponding to each of the plurality of apparatus units at the remote station, conductors interconnecting said stations, means at said controlling station for causing various combinations of different kinds of current to flow simultaneously through said conductors, means at said remote station for effecting the selection of one of said apparatus units in response to said current combinations, means for disconnecting the selective means from the conductors and for controlling the selected apparatus unit over said conductors, and means for simultaneously receiving at the controlling station over said conductors a plurality of indications from the remote station for simultaneously operating selectively said plurality of indicating devices.

9. In a supervisory control system, a controlling station, a remote station, a plurality of apparatus units at said remote station, each unit including a plurality of independently operable devices, a plurality of controlling devices at the controlling station corresponding to each of the apparatus units at the remote station, conductors interconnecting said stations, means at said controlling station for causing a single current impulse to flow through said conductors, each impulse comprising a combination of different kinds of current simultaneously flowing through said conductors for a predetermined time, means at said remote station for effecting the selection of one of said apparatus units in response to each single impulse, and means operative after a single impulse has been transmitted for effecting the disconnection of said selective means from said conductors and for connecting the independently operable devices of the selected apparatus unit and the corresponding controlling devices to said conductors so that the operable devices of the selected apparatus unit may be independently operated at will from the controlling station.

10. In a supervisory control system, a controlling station, a remote station, a plurality of apparatus units at said remote station, each including a plurality of independently operable devices, a plurality of controlling and indicating devices at the controlling station corresponding to each of the operable devices of each apparatus unit at the remote station, conductors interconnecting said stations, means at said controlling station for causing various combinations of different kinds of current to flow simultaneously through said conductors, means at said remote station for effecting the selection of one of said apparatus units in response to said current combinations, and means operative after a current combination has been transmitted for effecting the disconnection of said selective means at the remote station from said conductors and for connecting the independently operable devices of the selected apparatus unit and the corresponding controlling and indicating devices to said conductors so that said operable devices of the selected apparatus unit may be independently operated at will from the controlling station over said conductors and the indicating devices are selectively operated simultaneously over said conductors in accordance with the operation of the operable devices of the selected apparatus unit.

11. In a supervisory control system, a controlling station, a plurality of groups of devices, said groups of devices and said devices within each group being arranged in a predetermined order, each device having a plurality of positions, conductors interconnecting said station and said groups of devices, means at the controlled station for automatically causing a plurality of devices to change their positions substantially simultaneously, means at the controlled station for successively connecting sources of different kinds of current simultaneously to said conductors in various combinations under control of the plurality of devices which have changed positions; groups of indicating means at the controlling station corresponding to the groups of devices at the controlled station, and means responsive to the successive combinations of different kinds of current for effecting a selection of particular groups of indicating means and particular indicating means within each group, said selection of groups and particular indicating means in each group being effected in sequence in the same order as the groups of devices and particular devices within the groups are arranged at the controlled station.

12. In a supervisory control system, a controlling station, a plurality of devices, conductors interconnecting said station and said devices, means for selecting any of said devices including means for transmitting through said conductors a single predetermined current impulse corresponding to the desired device and means responsive to said single current impulse, control means at said controlling station, and means for rendering said control means operative to control a selected device including means responsive to the selection of a device for transmitting through said conductors a single predetermined current impulse corresponding to the selected device, and means responsive to said last mentioned impulse for effecting the connection of said control means and the selected device to said conductors if the proper device has been selected.

13. In a supervisory control system, a controlling station, a plurality of remote devices, conductors interconnecting said station and said devices, means for selecting any of said devices including means for transmitting through said conductors a single predetermined current impulse corresponding to the desired device and means responsive to said single current impulse, control means at said controlling station, indicating means at said controlling station individual to each device, and means for operating the indicating means individual to a selected unit to indicate the condition thereof and to render said control means operative to control a selected unit including means responsive to the selection of a device for transmitting through said conductors a single predetermined current impulse comprising a combination of different kinds of current corresponding to the selected device, and means responsive to said last mentioned impulse for effecting the operation of the signaling means individual to the selected device and for effecting the connection of said control means and the selected device to said conductors if the proper device has been selected.

14. In a supervisory control system, a controlling station, a remote station, conductors interconnecting said stations, a plurality of devices at said remote station, a control key at said controlling station individual to each of said devices, impulse transmitting means at said controlling station including means responsive to a predetermined operation of any control key for causing the initial current impulse transmitted between said stations after the operation of a control key to be of a character individual to the operated control key, and comprising a combination of different kinds of current simultaneously flowing between said stations through said conductors, selective means at said remote station responsive to said initial current impulse for selecting one of said devices, means at said remote station for transmitting between said stations a single current impulse of a character individual to a selected device and comprising a combination of different kinds of current simultaneously flowing between said stations through said conductors, selective means at said controlling station responsive to said last mentioned impulse, switching means operative when a device has been selected to remove the selective means at said remote station from the control of the impulse transmitting means at said controlling station and for causing the impulse transmitting means at the remote station to transmit said single impulse to the selective means at the controlling station, operating means at said controlling station for effecting the operation of a selected device, and means controlled by an operated control key and the selective means at said controlling station for placing the selected device under the control of said operating means over said conductors if the device selected corresponds to the operated control key.

15. In a supervisory control system, a controlling station, a remote station, conductors interconnecting said stations, a plurality of devices at said remote station, a control key at said controlling station individual to each of said devices, impulse transmitting means at said controlling station including means responsive to a predetermined operation of any control key for causing the initial current impulse transmitted between said stations after the operation of a control key to be of a character individual to the operated control key and comprising a combination of different kinds of current simultaneously flowing between said stations through said conductors, selective means at said remote station responsive to said initial current impulse for selecting one of said devices, means at said remote station for transmitting between said stations a single current impulse of a character individual to a selected device and comprising a combination of different kinds of current simultaneously flowing between said stations through said conductors, selective means at said controlling station responsive to said last mentioned impulse, switching means operative when a device has been selected to remove the selective means at said remote station from the control of the impulse transmitting means at said controlling station and for causing the impulse transmitting means at the remote station to transmit said single current impulse to the selective means at the controlling station, operating means at said controlling station for effecting the operation of a selected device, indicating means at said controlling station for indicating the position of a selected device, and means controlled by an operated control key and the selective means at said controlling station for placing the selected device under the control of said operating means over said conductors and said indicating means under the control of the selected device over said conductors if the device selected corresponds to the operated control key.

16. In a supervisory control system, a controlling station, a remote station, conductors interconnecting said stations, a plurality of devices at said remote station, a control key at said controlling station individual to each of said devices, impulse transmitting means at said controlling station including means responsive to a predetermined operation of any control key for causing the initial current impulse transmitted between said stations after the operation of a control key to be of a character individual to the operated control key and comprising a combination of different kinds of current simultaneously flowing between said stations through said conductors, selective means at said remote station responsive to said initial current impulse for selecting one of said devices, means at said remote station for transmitting between said stations a single current impulse of a character individual to a selected device and comprising a combination of different kinds of current simultaneously flowing between said stations through said conductors, selective means at said controlling station responsive to said last mentioned impulse, switching means operative when a device has been selected to remove the selective means at said remote station from the control of the impulse transmitting means at said controlling station and for causing the impulse transmitting means at the remote station to transmit said single current impulse to the selective means at the controlling station, operating and indicating means at said controlling station individual to each of said devices, and means controlled by an operated control key and the selective means at said controlling station for placing the selected device under the control of its individual operating means over said conductors and the indicating means individual to the selected device under the control thereof over said conductors if the selected device corresponds to the operated control key.

17. In a supervisory control system, a controlling station, a remote station, conductors interconnecting said stations, a plurality of devices at said remote station, a control key at said controlling station individual to each of said devices, impulse transmitting means at said controlling station including means responsive to a predetermined operation of any control key for causing the first two current impulses transmitted between said stations through said conductors after the operation of a control key to be of such a character as to constitute a code individual to the operated control key, selective means at said remote station responsive to said code for selecting one of said devices, means operative when a device has been selected for removing the selective means at said remote station from the control of the impulse transmitting means at the controlling station and for effecting the transmission between said stations through said conductors of two successive impulses of such a character as to constitute a code individual to the selected device, signalling means at said controlling station individual to each device, and selective means at said controlling station responsive to said last-mentioned code for selecting the signalling means individual to the selected device.

18. In a supervisory control system, a controlling station, a remote station, conductors interconnecting said stations, a plurality of groups of devices at said remote station, a control key at said controlling station individual to each of said devices, signalling means at said controlling station individual to each of said devices, means responsive to a predetermined operation of any control key for causing the transmission of two successive impulses between said stations through said conductors of such a character as to constitute a code individual to the operated control key, selective means at said remote station responsive to one of said impulses for selecting a particular group of devices thereat and responsive to the other of said impulses for selecting a particular device in the selected group, means operative after a device has been selected for removing said selective means at said remote station from the control of the impulse transmitting means at the controlling station and for effecting the transmission between said stations through said conductors of two successive impulses of such a character as to constitute a code individual to the selected unit, and selective means at said controlling station responsive to said last mentioned code for selecting the signalling means individual to the selected device.

19. In a supervisory control system, a controlling station, a remote station, conductors interconnecting said stations, a plurality of apparatus units at the remote station, a control key at said controlling station individual to each apparatus unit, impulse transmitting means at said controlling station including means responsive to the operation of any control key for causing the initial current impulse transmitted between said stations after the operation of a control key to be of a predetermined duration and to comprise a predetermined combination of different kinds of current simultaneously flowing between said stations through said conductors and individual to the operated control key, selective means at said remote station responsive to said initial current impulse for selecting an apparatus unit, means at said remote station for effecting the transmission between said stations for a predetermined time and before the operation of the selected apparatus unit of a single impulse individual to the selected apparatus unit, said single impulse being a combination of different kinds of current simultaneously flowing between said stations through said conductors, selective means at said controlling station responsive to said last mentioned impulse, and switching means operative to remove said selective means at said remote station from the control of the impulse transmitting means at said controlling station and for causing the impulse transmitting means at the remote station to transmit said single impulse to the selective means at the controlling station after said initial current impulse individual to an operated control key has been transmitted.

20. In a supervisory control system, a controlling station, a remote station, conductors interconnecting said stations, a plurality of devices at said remote station, an individual control switch at said controlling station for each of said devices, impulse transmitting means at said controlling station including means responsive to a predetermined operation of any control switch for causing the initial current impulse transmitted between said stations through said conductors after the operation of a control device to be of a character individual to the control switch, selective means at said remote station responsive to the character of said initial impulse for selecting one of said devices, selective means at said controlling station, means operative at the termination of said initial current impulse for removing said selective means at the remote station from the control of said impulse transmitting means and for effecting the transmission from said remote station to said selective means at said controlling station through said conductors of a single current impulse individual to the selected device but distinguishably different in character from the initial impulse which effected the selection of the device, operating means at said controlling station, and means controlled by said selected means at said controlling station in response to the impulse transmitted thereto from the remote station for placing the selected device under the control of said operating means over said conductors.

21. In a supervisory control system, a controlling station, a remote station, conductors interconnecting said stations, a plurality of devices at said remote station, a control key at said controlling station individual to each of said devices, impulse transmitting means at said controlling station including means responsive to a predetermined operation of any control key for causing the first two current impulses transmitted between said stations through said conductors after the operation of a control key to be of such a character as to constitute a code individual to the operated control key, selective means at said remote station responsive to said code for selecting one of said devices, means operative when a device has been selected for removing the selective means at said remote station from the control of the impulse transmitting means at the controlling station and for effecting the transmission between said stations through said conductors of two successive impulses of such a character as to constitute a code individual to the selected device, operating means at said controlling station, and selective means at said controlling station responsive to said last mentioned code for placing the selected device under the control of said operating means over said conductors.

22. In a supervisory control system, a controlling station, a remote station, conductors interconnecting said stations, a plurality of groups of devices at said remote station, a control key at said controlling station individual to each of said devices, means responsive to a predetermined operation of any control key for causing the transmission of two successive impulses between said stations through said conductors of such a character as to constitute a code individual to the operated control key, selective means at said remote station responsive to the character of the first impulse for selecting a particular group of devices and responsive to the character of the next impulse transmitted between said stations for selecting a particular device in the selected group, means operative after a device has been selected for removing said selective means from the control of the impulse transmitting means at the controlling station and for effecting the transmission between said stations through said conductors of two successive impulses of such a character as to constitute a code individual to the selected device, operating means at said controlling station, signalling means at the controlling station individual to each device, and selective means at said controlling station responsive to said last mentioned code for selecting the signalling means individual to the selected device and for placing the selected device under the control of said operating means over said conductors if the selected device corresponds to the operated control key.

23. In a supervisory control system, a controlling station, a plurality of remote devices, conductors interconnecting said station and said devices, an individual control switch at said controlling station for each remote device, impulse transmitting means at said controlling station including means responsive to a predetermined operation of any control switch for causing the initial current impulse transmitted between said station and said remote devices through said conductors after the operation of a control device to be of a character individual to the control switch, selective means associated with said devices and responsive to the character of said initial impulse for selecting one of said devices, selective means at said controlling station, means operative at the termination of said initial current impulse for removing said selective means associated with said devices from the control of said impulse transmitting means and for effecting the transmission from said remote devices to said selective means at said controlling station through said conductors of a single current impulse of a character individual to the selected device, operating means at said controlling station, and means controlled by said selective means at said controlling station in response to the impulse transmitted thereto from said remote devices for placing the selected device under the control of said operating means over said conductors.

24. In a supervisory control system, a controlling station, a plurality of devices, conductors interconnecting said station and said devices, means for selecting any of said devices including means for transmitting a current impulse code through said conductors, control means at said controlling station, checking means responsive to the selection of a device for determining while the selected device remains disconnected from said conductors whether the device selected corresponds to the transmitted impulse code, and means controlled by said checking means for effecting the connection of said control means and the selected device to said conductors if the proper device has been selected.

25. In a supervisory control system, a controlling station, a plurality of devices, conductors interconnecting said station and said devices, means for selecting a device including means for transmitting through said conductors a single current impulse of a character individual to the desired device, control means at said controlling station, checking means responsive to the selection of a device for determining while the selected device remains disconnected from said conductors whether the device selected corresponds to the single current impulse transmitted, and means controlled by said checking means for effecting the connection of said control means and the selected device to said conductors if the proper device has been selected.

JUDSON O'D. SHEPHERD.